United States Patent [19]
Ott

[11] Patent Number: 4,641,810
[45] Date of Patent: Feb. 10, 1987

[54] ADJUSTABLE VIBRATION DAMPENING MOTOR MOUNT FOR MOTORCYCLES

[76] Inventor: Vernon D. Ott, Plaza Lanes, 1340 Mt. Vernon Ave., Marion, Ohio 43302

[21] Appl. No.: 673,426

[22] Filed: Nov. 20, 1984

[51] Int. Cl.[4] ............................................. F16M 13/02
[52] U.S. Cl. ..................................... 248/635; 248/638
[58] Field of Search ............... 248/635, 611, 613, 638; 180/300; 403/43, 44, 46; 267/153, 141, 141.2

[56] References Cited

U.S. PATENT DOCUMENTS

| | | | |
|---|---|---|---|
| 3,053,526 | 9/1962 | Kendall | 267/141 X |
| 3,786,695 | 1/1974 | Barrett, Jr. | 403/43 X |
| 3,809,172 | 5/1974 | Hendrickson et al. | 267/141 X |
| 4,012,967 | 3/1977 | Warren | 403/43 X |
| 4,232,563 | 11/1980 | Peterson et al. | 248/635 X |
| 4,518,058 | 5/1985 | Fister et al. | 180/300 |

FOREIGN PATENT DOCUMENTS

| | | | |
|---|---|---|---|
| 467150 | 1/1953 | Italy | 267/153 |
| 56-81748 | 4/1982 | Japan | 180/300 |

*Primary Examiner*—Ramon S. Britts
*Assistant Examiner*—Karen J. Chotkowski
*Attorney, Agent, or Firm*—Sidney W. Millard

[57] ABSTRACT

A motor mount for a motorcycle motor has one end attached to the motorcycle frame and the other to the motor. Intermediate the ends is a socket having a reciprocal piston therein. The piston is held within the socket by a threaded plug having an opening therein to allow the extension of a piston rod to engage one of the motor mount ends. The opposite end of the motor mount is attached to one end of the socket. Each end of the piston within the socket is abutted by an elastomeric member for purposes of dampening vibration and minimizing wear on the ends of the mount.

6 Claims, 6 Drawing Figures

ADJUSTABLE VIBRATION DAMPENING MOTOR MOUNT FOR MOTORCYCLES

FIELD OF THE INVENTION

This invention relates to an apparatus for mounting a motor on a motorcycle and for mounting other equipment to minimize the transmission of vibrations.

BACKGROUND OF THE INVENTION

Motorcycles inherently subject their components to shock and vibration because of the way they are designed to be used. It has been the practice to mount their motors on the frame as rigidly as possible to try to minimize secondary vibrations after impacts transmitted from the wheels to the frame. Unfortunately, many impacts on the tires are not fully absorbed by the tires and the associated shock absorbers. The problem is that the rigidity of the rods tends to transmit vibrations which are undesirable.

Such rods as are available are rigid as assembled. They comprise a conventional turnbuckle arrangement for adjustment and the assembled result is rigid shock-transmitting connection. In addition the mere fact of the rigidity results in unnecessarily severe wear on the eyelets comprising the ends of the motor mount as well as the prongs on which they are mounted.

SUMMARY OF THE INVENTION

As a result of these wear and vibration problems a motor mount has been designed which is rotationally and longitudinally adjustable and which has, intermediate its ends, a vibration dampening structure.

One of the eyelets comprising the end portion of the motor mount includes a projection which is externally threaded and the eyelet on the other end includes a projection which is internally threaded.

The externally threaded projection of the one end portion threads directly into one end of a socket. On the opposite end of the socket from the threaded connection is a cavity. This cavity of the socket has in its internal end an elastomeric abutment. A longitudinally slideable piston fits within the cavity juxtaposed to the elastomeric abutment.

A piston rod projects from the piston beyond the cavity of the socket to engage the other end of the motor mount and the piston rod includes external threads which are designed to be in engagement with the internally threaded part of said other motor mount end.

The piston is prevented from relative rotation with respect to the socket by a slot in the periphery of the piston which slot is engaged by a stationary pin projecting from the internal surface of the cavity.

A plug threads into the open mouth of the cavity and a central opening in the plug allows the threaded piston rod to project therethrough. This plug holds the piston within the cavity and prevents relative longitudinal reciprocation between the socket and piston. Sandwiched between the piston and the plug is a second elastomeric member.

The two elastomeric members in combination serve to dampen vibrations transmitted from the frame and/or the motor and minimize wear on the two end portions of the motor mount. The threaded portions identified allow linear adjustment of the motor mount as needed as well as angular adjustment of the eyelets if required.

Specific objects of the invention will be clear from a detailed reading of the specification which follows combined with an observation of the drawings.

DESCRIPTION OF THE PREFERRED EMBODIMENT

Figure 1:
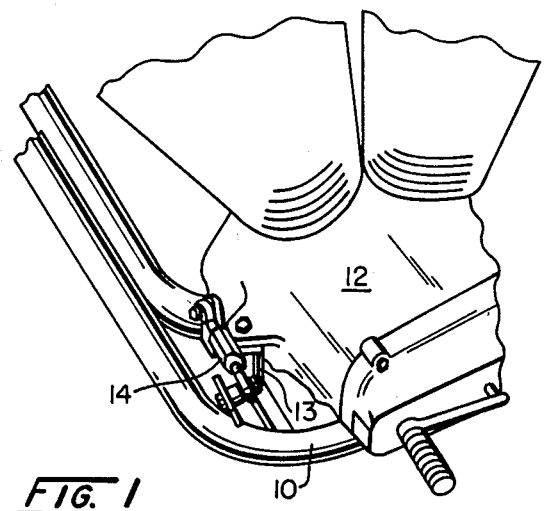
FIG. 1 is a fragmentary perspective view of a motor on a motorcycle frame showing the motor mount of this invention attached to the frame and to the motor.
Figure 2:
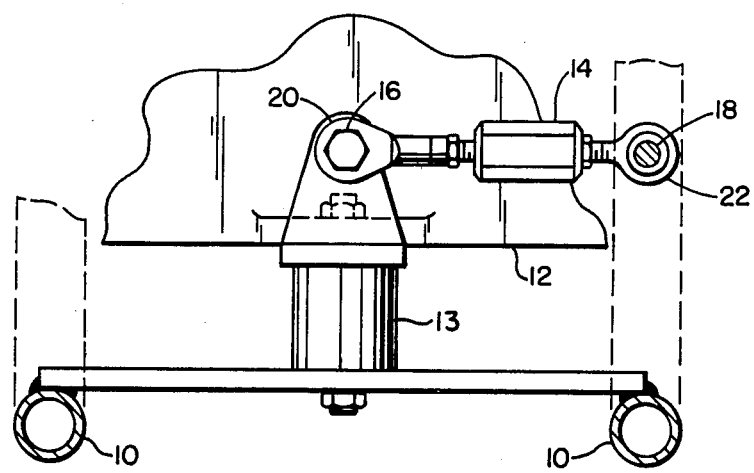
FIG. 2 is an enlarged fragmentary view of the motor mount of FIG. 1 oriented with respect to the motor and frame.

Turning now to FIG. 1, a motorcycle frame 10 has a motor 12 mounted thereon. The motor is supported in place by a plurality of motor mounts 13, 14. The mount 14 is the subject of this invention, both alone and in combination.

Figure 3:
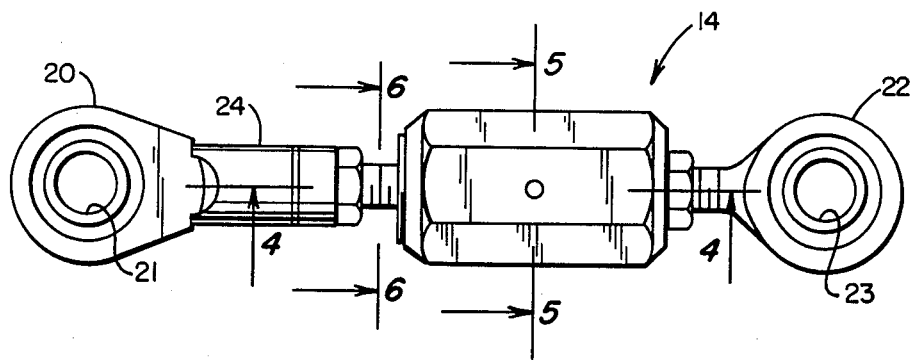
FIG. 3 is an enlarged view of the motor mount.
Figure 4:
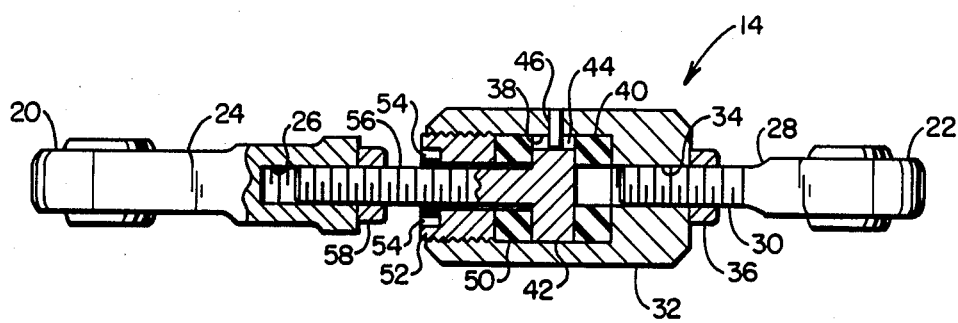
FIG. 4 is a fragmentary sectional view of FIG. 3 taken along line 4—4 of FIG. 2.
Figure 5:
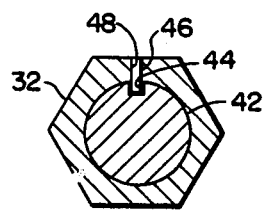
FIG. 5 is a sectional view taken along line 5—5 of FIG. 3.
Figure 6:
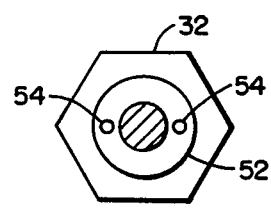
FIG. 6 is a sectional view taken along line 6—6 of FIG. 3.

One end of the motor mount 14 is secured on a peg 16 on the motor (in this case a bolt threaded into the motor) while the other is secured on a peg 18 on the frame. The ends 20 and 22 include eyelets 21 and 23, best seen in FIG. 3, which are of conventional design and may include elastomeric grommets around the openings mounted on the pegs.

The first end 20 includes an extension 24 which includes an opening having internal threads 26. The opposite end 22 has a extension 28 having external threads 30.

A socket 32 having an internally threaded opening 34 is mounted in threaded engagement with the threaded portion 30 of exstension 28. Adjustment of the length of the motor mount may be partially controlled by the degree of insertion of the threaded portion into the threaded opening 34. After a satisfactory adjustment is made, the extension 28 and socket 32 may be locked against relative rotation by a first lock nut 36.

The opposite end of the socket 32 includes a cylindrical cavity 38. The innermost end of the cavity includes an first elastomeric abutment 40. The abutment 40 is illustrated as being a washer shape having an opening in its center corresponding in size to the internally threaded opening 34. This is a desirable situation to prevent the inadvertent scoring of the abutment 40 should the threaded projection 28 be threaded into the opening 34 beyond the normal position shown in FIG. 3. However, this invention does not require that the abutment 40 be washer shaped.

Juxtaposed to the first elastomeric abutment 40 is a piston 42 which has a peripheral surface generally conforming to the internal surface of the cavity 38. The purpose is to allow longitudinal reciprocation of the piston within the cavity to conform the motor mount to the desired position. To prevent relative rotational movement of the socket 32 and the piston 42, a slot 44 is cut in the periphery of the piston and when it slides into the cavity it is rotated to allow the piston to slide over a pin 46 projecting through an opening 48 in the side wall of the socket.

A second elastomeric abutment 50 is mounted on the opposite side of the piston from the first abutment and within the cavity. The second abutment 50 is sandwiched between the piston and an externally threaded plug 52 which is designed to hold the piston within the cavity and prevent relative longitudinal movement between the socket and the piston. Because of the relatively short length and close working relationship involved, holes 54 are formed in the outer end of plug 52 to allow the tightening of the plug by a spanner wrench.

An externally threaded piston rod 56 projects through a central opening in the second elastomeric abutment 50 and the plug 52 and is designed to be in threaded engagement with the internal threads 26 in extension 24 on the end 20 of the motor mount. Longitudinal adjustment of the length of the motor mount may be accomplished by relative rotation of the end 20 with respect to the piston rod 56 until the desired length is achieved. Thereafter the two may be locked against relative rotational movement by a second lock nut 58.

In operation the end 22 is first mounted on one or the other of the pegs 16, 18 and the socket is rotated one way or the other on extension 28 to get a rough adjusted length for the motor mount and at that point the lock nut 36 is tightened in place. Next the spanner wrench will tighten the plug 52 to the desired compression of the two elastomeric abutments 40 and 50. The last and final adjustment will be to rotate the end 20 with respect to the piston rod 56 until proper length adjustment is achieved and the eyelet 21 is slipped in place on the other mounting peg. Thereafter the second lock nut 58 is tightened into place.

Having thus described the invention in its preferred embodiment it will be clear to those having ordinary skill in the art that certain modifications may be made to the invention without departing from the spirit of the invention. For example, the cavity 38 could be polygonal in structure which would eliminate the need for the slot 44, pin 46 and hole 48. In that case the plug 52 would be restructured to conform to the internal polygonal shape of the socket 32 and threads could be formed on the exterior of the socket and a detached threaded female member having an internally extending flange could be tightened on the socket to push the plug into place.

It is not intended that the words used to describe the invention nor the drawings illustrating the preferred embodiment be limiting, rather it is intended that the invention only by the scope of the appended claims.

I claim:

1. An adjustable vibration dampening motor mount for use on a motorcycle including two ends, means on one end attached to a peg fixed to a motorcycle motor and means on the other end attached to a second peg fixed to a motorcycle frame, means intermediate the ends for adjusting the length of the mount and the angular orientation of the ends, one of said ends having an externally threaded extension and the other having an internally threaded extension, the adjusting means including a socket being internally threaded at one end, the externally threaded extension on said one end being in threaded engagement with said internally threaded end of the socket, means for locking the socket and the externally threaded extension against relative rotation with a particular angular relationship, the end of the socket remote from said threaded engagement including means forming a cavity having an inner end, means forming a first elastomeric abutment in engagement with said inner end, said elastomeric abutment being free to move both longitudinally and rotationally with respect to said socket, a piston mounted in said cavity adjacent said abutment wherein said abutment is free to move rotationally with respect to said piston, said piston having a periphery conforming in shape to the shape of the cavity to allow lineal reciprocation of said piston within said cavity and with respect to said elastomeric abutment, a piston rod attached to said piston and extending from said cavity into threaded engagement with the internally threaded extension, means for locking the rod and extension against relative rotation with a particular angular relationship, means for retaining the piston within the cavity, a second elastomeric abutment within said cavity, said second elastomeric abutment being on the opposite side of the piston from said first elastomeric abutment, said second elastomeric abutment being free to move both longitudinally and rotationally with respect to the socket and this piston, means for preventing relative rotation while allowing relative longitudinal movement between said piston and said socket.

2. The motor mount of claim 1 wherein means for retaining the piston within the cavity comprises a threaded plug having a central opening therein, the piston rod extending through said central opening, the threads of said plug being in engagement with a second set of threads on said socket.

3. The motor mount of claim 2 wherein the second set of threads on said socket are within the cavity.

4. The motor mount of claim 3 wherein the means for preventing relative rotation between the piston and the socket comprises a slot in the piston periphery which mates with a stationary pin projecting from the cavity surface into said slot.

5. The motor mount of claim 1 wherein the means for preventing relative rotation between the piston and the socket comprises a slot in the piston periphery which mates with a stationary pin projecting from the cavity surface into said slot.

6. The motor mount of claim 4 including means for preventing relative rotation between the ends of the motor mount.

* * * * *